United States Patent
Stowell (10) Patent No.: US 7,775,017 B2
(45) Date of Patent: Aug. 17, 2010

(54) SEALING HEATER (75) Inventor: James Robert Stowell, Salem, OR (US)

(73) Assignee: Xerox Corporation, Norwalk, CT (US)

( * ) Notice: Subject to any disclaimer, the term of this patent is extended or adjusted under 35 U.S.C. 154(b) by 136 days.

(21) Appl. No.: 11/641,232

(22) Filed: Dec. 19, 2006

(65) Prior Publication Data
US 2008/0141623 A1 Jun. 19, 2008

(51) Int. Cl.
B65B 7/28 (2006.01)

(52) U.S. Cl. .......................... 53/287; 53/281; 53/329.3; 53/374.6; 53/453; 53/477

(58) Field of Classification Search .................. 53/281, 53/287, 329.3, 374.6, 246, 247, 453, 467, 53/477, 534, 558, 559, 561, 574, 579
See application file for complete search history.

(56) References Cited

U.S. PATENT DOCUMENTS

| 3,397,508 A | * | 8/1968 | Stroop | 53/559 |
| 3,481,100 A | * | 12/1969 | Bergstrom | 53/433 |
| 4,085,565 A | * | 4/1978 | Mahaffy et al. | 53/511 |
| 4,349,997 A | * | 9/1982 | Hayasaka et al. | 53/51 |
| 4,372,098 A | * | 2/1983 | Mason | 53/412 |
| 4,777,782 A | * | 10/1988 | Nixon et al. | 53/433 |
| 4,969,965 A | | 11/1990 | Matty et al. | |
| 5,040,357 A | * | 8/1991 | Ingemann et al. | 53/478 |
| 5,091,199 A | | 2/1992 | Mally et al. | |
| 5,105,603 A | * | 4/1992 | Natterer | 53/412 |
| 5,319,910 A | * | 6/1994 | Takata et al. | 53/412 |
| 5,329,750 A | * | 7/1994 | Bagley et al. | 53/559 |
| 5,517,805 A | * | 5/1996 | Epstein | 53/453 |
| 5,682,729 A | | 11/1997 | Buchko | |
| 6,282,866 B1 | * | 9/2001 | Natterer et al. | 53/282 |
| 6,460,720 B1 | | 10/2002 | Massey et al. | |
| 6,499,271 B1 | | 12/2002 | Lastovich et al. | |
| 6,701,695 B1 | * | 3/2004 | Douglas | 53/511 |
| 2003/0196412 A1 | * | 10/2003 | Foulke, Jr. | 53/432 |

* cited by examiner

Primary Examiner—Thanh K Truong
(74) Attorney, Agent, or Firm—Maginot, Moore & Beck LLP (57) ABSTRACT A sealing heater for heat sealing a film onto a multi-compartment container comprises a heating block having a contact surface. The contact surface includes an outer sealing portion and an intermediate sealing portion. The outer sealing seals a film to a perimeter surface of a multi-compartment tray and the intermediate sealing portion seals a film to substantially all of an intermediate surface between the compartments of the multi-compartment tray. The outer sealing portion and the intermediate sealing portion defining recess perimeters in the contact surface that are positioned to correspond substantially to the compartment perimeters in the multi-compartment tray. A heating element is disposed within the heating block for generating heat at the contact surface of the heating block sufficient to heat seal the sealing film to the perimeter surface and the intermediate surface between the compartments of the multi-compartment tray.

6 Claims, 9 Drawing Sheets

SEALING HEATER

TECHNICAL FIELD

This disclosure relates generally to sealing a container, and, more particularly, to a sealing heater for sealing a lid onto a container for holding solid ink sticks.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed, belt driven or urged by a spring through the feed chute toward a heater plate in the heater assembly. The heater plate melts the solid ink impinging on the plate into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Phase change inks for color printing typically comprise a phase change ink carrier composition which is combined with a phase change ink compatible colorant. A color printer typically uses four colors of ink (yellow, cyan, magenta, and black). These colored inks can be formed by using a single dye or a mixture of dyes. For example, magenta can be obtained by using a mixture of Solvent Red Dyes or a composite black can be obtained by mixing several dyes. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Due to the soft, waxy nature of an ink stick body, ink sticks may be easily damaged during handling. Therefore, it is common to package ink sticks in containers after manufacturing. Typically, ink sticks are placed in a tray, such as a thermoformed polystyrene tray having one or more cavities, or compartments, for holding a plurality of ink sticks. The trays typically have a flange that surrounds the perimeter of the package and intermediate flanges that separate each compartment of the tray. A thermoplastic film or laminate may then be positioned over tray and heat sealed to the flanges to hermetically enclose the ink sticks within each compartment.

To heat seal the film to the tray, a heated bar engages the film to compress it against the flanges of the tray. In so doing, heat transfers from the heated bar to the film, through the thickness of the film, and to the flange of the tray. The resulting heat and compression causes the contacting surfaces of the film and flange to become molten and to intermix with one another. The heating bar is then removed to allow the sealed area to cool and form a sealed bond.

One of the chief difficulties encountered when applying films to containers is the maintenance of consistent seal strength for the containers produced. This problem is exacerbated by the increasing complexity of ink stick shapes which results in increased size for the compartments for containing the ink sticks in the trays. Because it may not be practical or economical to keep increasing the overall size of the containers to accommodate the ink sticks, the increasing size of the compartments in the trays may limit the areas upon which to seal the film. Therefore, the reduction in the potential sealable area may lead to a reduction in seal strength in these reduced areas resulting in the film possibly peeling off of the trays. Not only does this have an aesthetically unpleasing appearance, but the ink sticks in the trays may be exposed to contaminants such as excessive moisture.

Prior systems typically used a substantially flat heated bar to press the sealing film against the flange of the tray. This method has the disadvantage of heating the sealing film directly over the compartments and, consequently, the contents of the compartments which, in the solid ink sticks, may damage and/or otherwise melt the contents of the container. To avoid this, some previously known sealing bars were equipped with thin strips, or ridges, that were shaped and positioned on the bar to correspond to the lip of the compartment on the tray. In the case of a multi-compartment container, the heated bar 2 may have a plurality of ridges 4 positioned on the bar to contact the areas of the flange of the tray surrounding each compartment (See FIG. 1). The ridges 4 ensure that the maximum heat and pressure would be applied to only the areas surrounding each container thereby lessening the amount of heat directly over the compartments.

Figure 1:
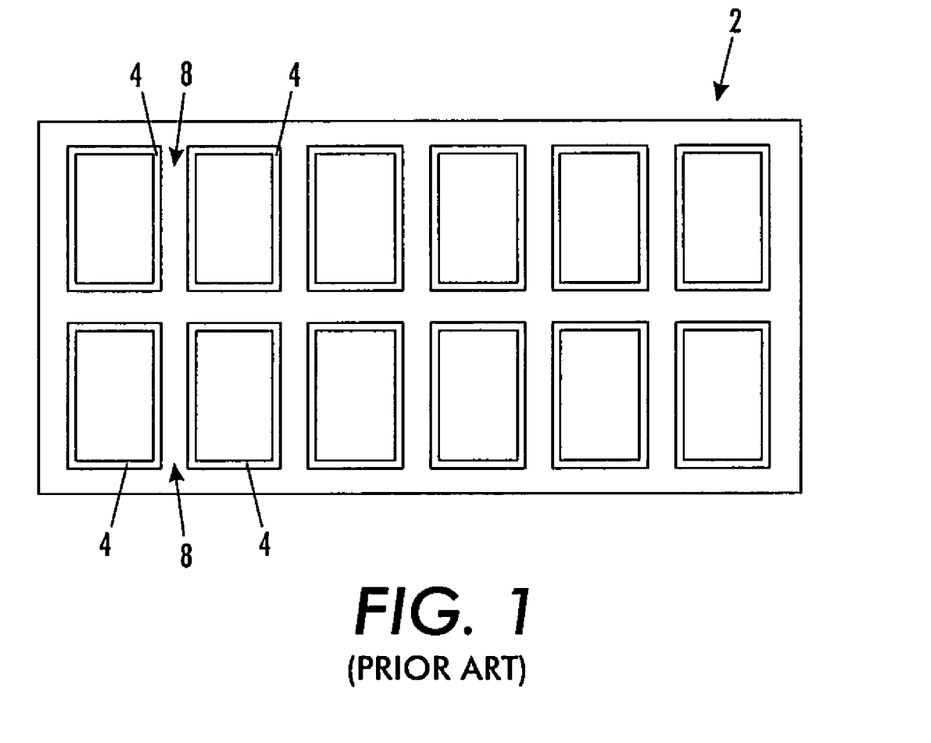
FIG. 1 is a perspective view of a prior art sealing heater.

The use of ridges, however, presented additional problems to sealing the film onto the tray. For instance, as can be seen in FIG. 1, the ridges 4 may leave gaps 8 in the contact surface which may result in unsealed areas in the flange areas between the sealed compartments. Typically, the sealed trays containing the ink sticks would be scored in the flange areas between the tray compartments to facilitate separation of the compartments from the tray. The scoring may increase the likelihood of seal failure and unintentional peeling of the film in these areas due to the unsealed gaps. In addition, any misalignment of the ridges of the seal plate with respect to the compartments of the tray during sealing may cause a misalignment and misplacement of the actual seal created between the film and the tray resulting in gaps or breaks in the seal.

SUMMARY

In one embodiment, a sealing heater for heat sealing a film onto a multi-compartment container comprises a heating block having a contact surface. The contact surface includes an outer sealing portion and an intermediate sealing portion. The outer sealing seals a film to a perimeter surface of a multi-compartment tray and the intermediate sealing portion seals a film to substantially all of an intermediate surface between the compartments of the multi-compartment tray. The outer sealing portion and the intermediate sealing portion defining recess perimeters in the contact surface that are positioned to correspond substantially to the compartment perimeters in the multi-compartment tray. A heating element is disposed within the heating block for generating heat at the contact surface of the heating block sufficient to heat seal the sealing film to the perimeter surface and the intermediate surface between the compartments of the multi-compartment tray.

In another embodiment, a tray sealing system for heat sealing a film onto a multi-compartment container comprises a tray support for receiving a multi-compartment tray. The tray support includes a perimeter ledge upon which a perimeter flange of the tray rests and intermediate ledges upon which intermediate tray portions between compartments. The system includes a sealing heater having a contact surface for contacting and heat sealing a sealing film placed over the tray received in the tray support. The contact surface includes an outer sealing portion for contacting the sealing film over the perimeter flange of the tray and intermediate sealing portion for contacting the sealing film over the intermediate tray portions between compartments. The intermediate sealing portions having widths at least as wide as the intermediate tray portions between the compartments. The system also includes an actuator for pressing the tray support and sealing plate together such that the sealing film is pressed against the multi-compartment tray between the tray support and the contact surface of the sealing heater.

In yet another embodiment, a system for forming, filling and sealing multi-compartment packages for solid ink sticks comprises a tray forming station for forming multi-compartment trays configured to hold solid ink sticks; a loading station for loading an ink stick into at least one compartment of the formed multi-compartment trays; and a sealing film dispenser for placing a sealing film over the formed and filled multi-compartment trays. The system includes a tray sealing station for sealing the films to flanges of the formed and filled tray. The tray sealing station has a sealing heater having a contact surface for contacting and heat sealing the sealing films placed over the trays. The contact surface includes an outer sealing surface for contacting the sealing film over a perimeter flange of the tray and an intermediate sealing surface for contacting the sealing film over the tray portions between compartments. The intermediate sealing surface has widths at least as wide as the tray portions between compartments. The system also includes a scoring station for scoring the formed, filled and sealed trays along the tray portions between compartments of the trays to facilitate separation of the compartments of the trays.

BRIEF DESCRIPTION OF THE DRAWINGS

The foregoing aspects and other features of a printer implementing a power conservation process are explained in the following description, taken in connection with the accompanying drawings, wherein.

DETAILED DESCRIPTION

For a general understanding of the present embodiments, reference is made to the drawings. In the drawings, like reference numerals have been used throughout to designate like elements.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. An example of the printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink loader delivers ink to the printing mechanism. The ink loader is contained under the top surface of the printer housing. The top surface of the housing includes a hinged ink access cover 20 that opens as shown in FIG. 2, to provide the operator access to the ink loader.

Figure 2:
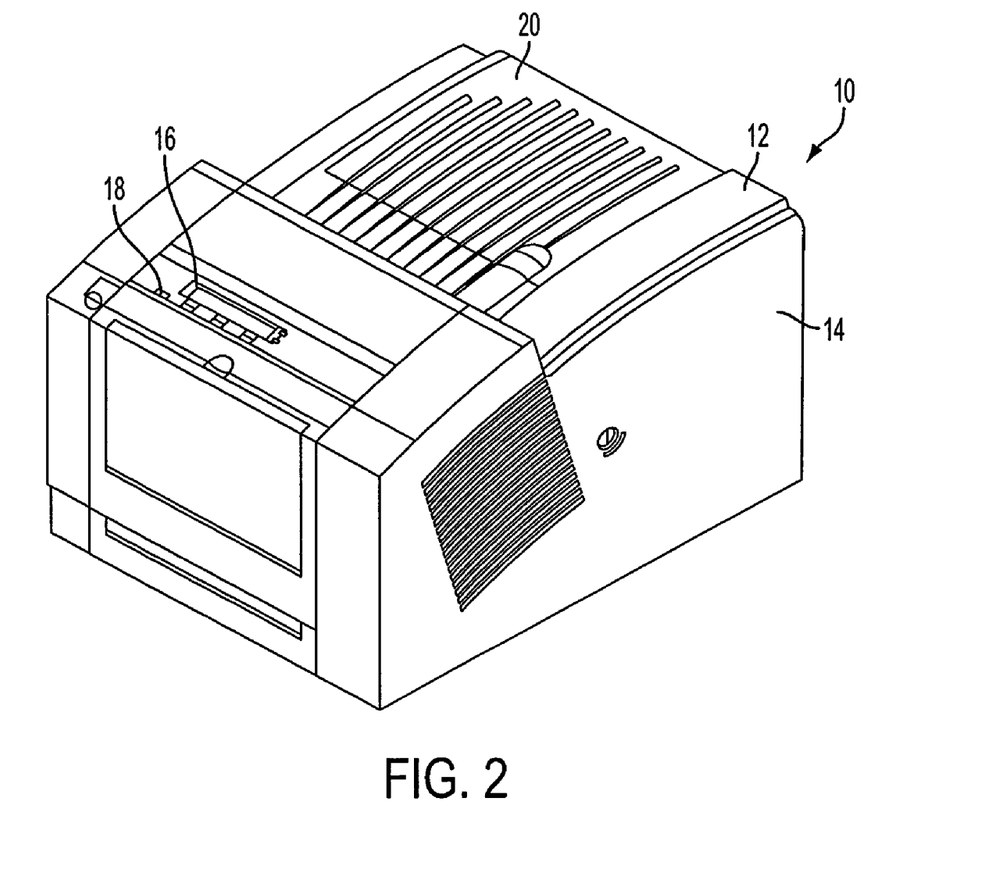
FIG. 2 is a perspective view of a solid ink printer.
Figure 3:
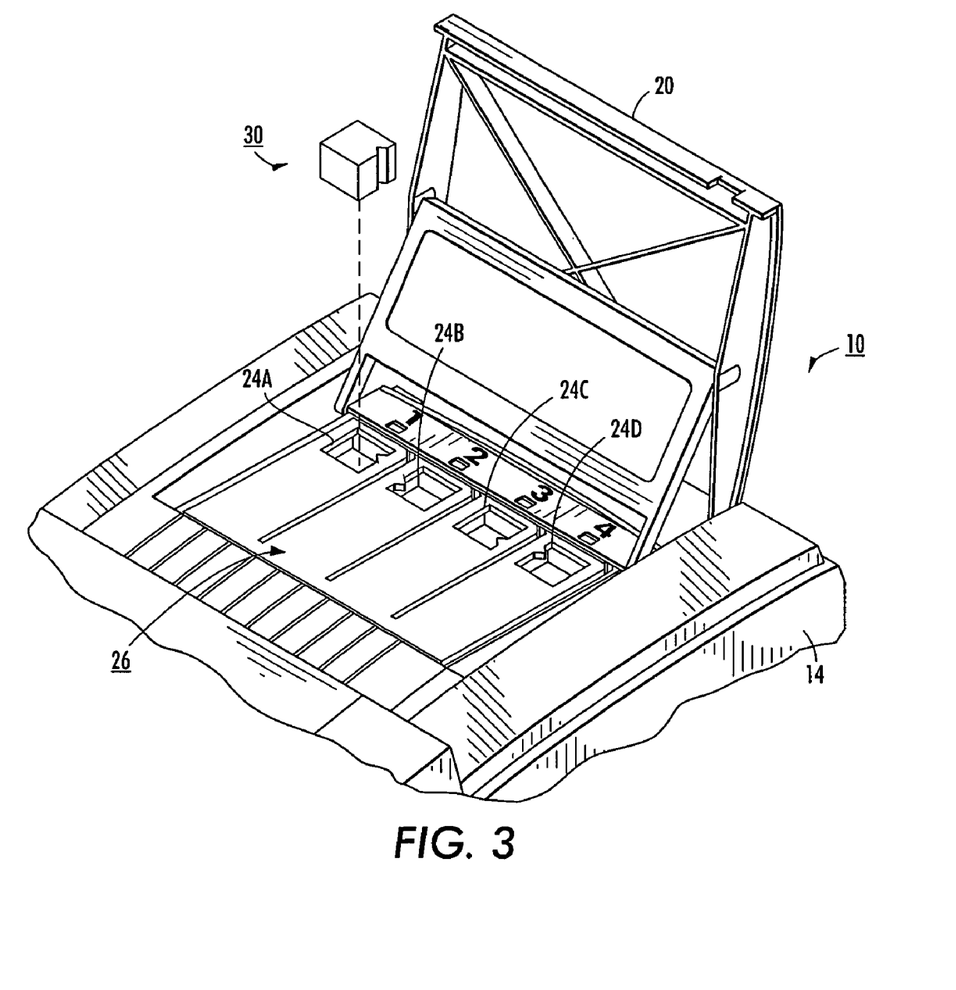
FIG. 3 is a partial top perspective view of the phase change printer with the ink access cover open.

FIG. 2 is a partial top/front perspective view of the phase change ink printer 10 with its ink access cover 20 open. As seen in FIG. 2, opening the ink access cover 20 reveals a key plate 26 having keyed openings 24. Each keyed opening 24A, 24B, 24C, 24D provides access to an insertion end of one of several individual feed channels of the solid ink feed system (not shown). A color printer typically uses four colors of ink (black, cyan, magenta, and yellow). Each color corresponds to one of the feed channels. Each feed channel delivers ink sticks to a corresponding melt plate at the melt end of the feed channel. The melt plate melts the solid ink stick into a liquid form for jetting onto an imaging member.

Figure 4:
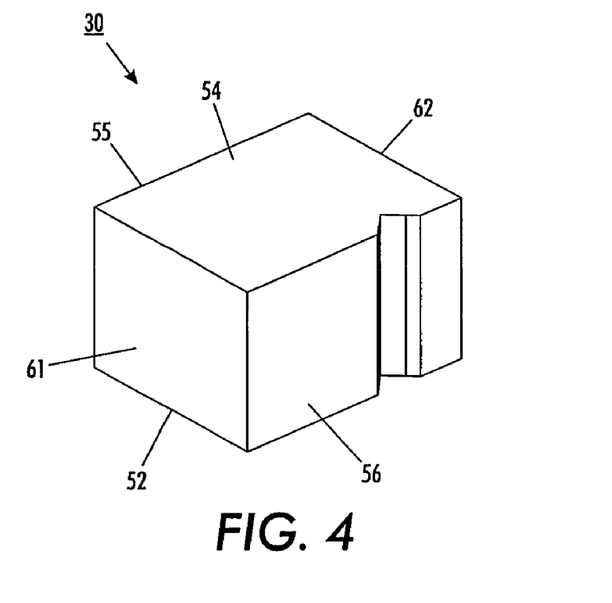
FIG. 4 is a perspective view of one embodiment of a solid ink stick.

An exemplary solid ink stick 30 for use in the feed system is illustrated in FIG. 4. The ink stick is formed of a three dimensional ink stick body. A substantially cubic ink stick body is illustrated. The ink stick body illustrated has a bottom, represented by a general bottom surface 52, and a top, represented by a general top surface 54. The top and bottom surfaces are shown substantially parallel one another. The ink stick body also has a plurality of side extremities, such as side surfaces 55, 56, 61, 62. The side surfaces 55, 56 are substantially parallel one another, and are substantially perpendicular to the top and bottom surfaces 52, 54. The side surfaces 61, 62 are also substantially parallel one another, and substantially perpendicular to the top and bottom surfaces, and to the lateral side surfaces.

The respective surfaces of the ink stick body need not be substantially flat, nor need they be substantially parallel or perpendicular to one another. Other shapes of the side and end surfaces are also possible, including curved surfaces. The aspect ratios of the ink stick length to height to width could be substantially different. Some ink sticks may be quite long relative to their width, as example. The ink stick can be generally elongated lengthwise, widthwise or even in height or be altered in form in other ways. The lateral side surfaces can also be segmented or stepped, so that one portion of the ink stick body is narrower than another. Nevertheless, the present descriptions should aid the reader in visualizing, even though the surfaces may have three dimensional topographies, or be angled with respect to one another. The ink stick body may be formed by pour molding, injection molding, compression molding, or other known techniques.

Figure 5:
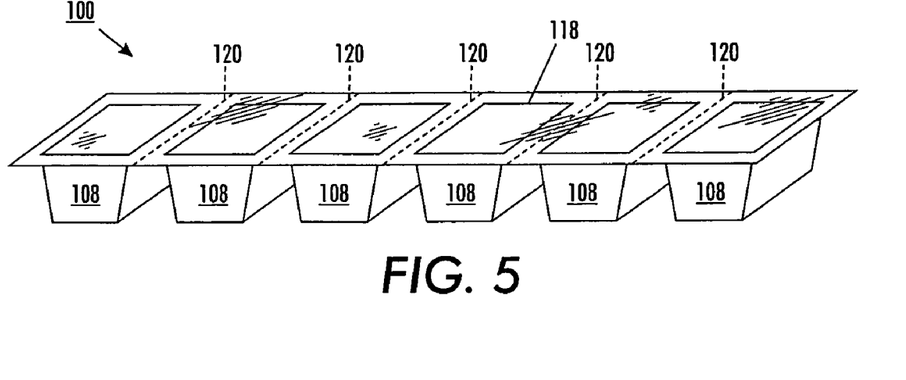
FIG. 5 is a perspective view of one embodiment of a multi-compartment tray for containing solid ink sticks.
Figure 6:
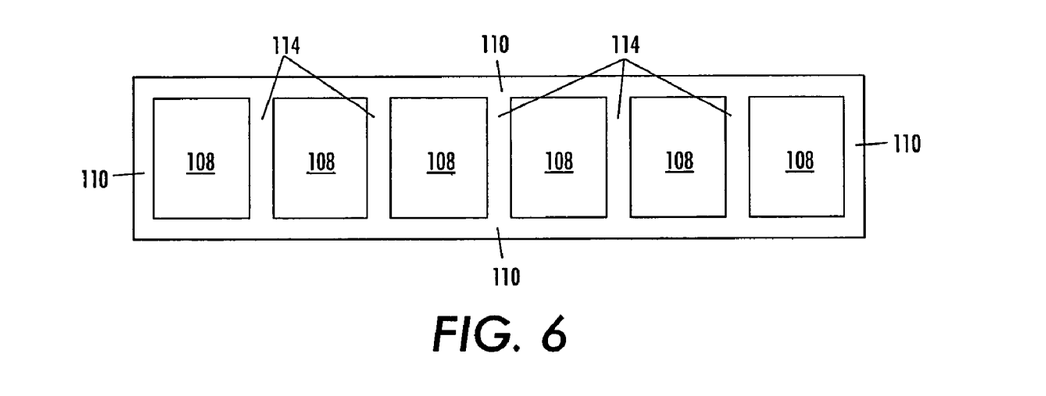
FIG. 6 is a top view of the tray of FIG. 5.

After formation, ink sticks are typically packaged to facilitate handling and transportation prior to use. Packaging ink sticks may protect ink sticks from handling damage and contamination from dirt, dust and other contaminants and may prolong shelf life. FIG. 5 illustrates one embodiment of a package 100 for containing solid ink sticks. In this embodiment, the package 100 includes a product tray 104 having one or more cavities, or compartments, 108 into ink sticks may be disposed and a flange for providing a surface for attachment of a sealing film. In the embodiment of FIG. 5, the tray includes six cavities 108 although any suitable number of cavities as well as arrangement of cavities may be employed. Each cavity 108 is illustrated as generally rectangular in shape, but they may be any suitable shape as appropriate for the configuration of ink stick to be packaged and for the means of shipping and storing the package. The tray 104 may be formed of a plastic material, such as, for example, high impact polystyrene, but may be of any material of sufficient strength to protect the ink sticks within the tray.

The flange of the tray is comprised of an outer perimeter flange 110 and an inner intermediate flange 114. The perimeter flange 110 extends around the perimeter of the tray 104 and may be any suitable width. The cavities 108 are interconnected to each other by integral and connective intermediate flanges 114. The perimeter 110 and intermediate flanges 114 may be substantially coplanar, and, together, may provide a sealing surface to which a sealing film may be attached to the tray to enclose ink sticks within the cavities.

The sealing film 118 may be comprised of a thermoplastic lidding material, generally in sheet or web form, having one or more layers formed from polymeric or other materials that may be heat sealed to the flange of the tray. The sealing film may be transparent to allow viewing of ink sticks in the package without having to remove the film. The sealing film may include an adhesive layer that is heat and/or pressure activated. Alternatively, the sealing film 118 may include an adhesive applied to sealing film and/or the flange of the tray. Any suitable adhesive may be used depending upon the materials used for tray and film. The sealing of the film 118 to the tray 104 forms a substantially gas-impermeable enclosure for the ink sticks to substantially isolate the ink sticks from contact with the surrounding environment including, in particular, atmospheric oxygen, but also including dirt, dust, moisture, etc. The sealing film is configured to be removed, or peeled, from all or at least a portion of the tray to provide access to one or more ink sticks disposed in cavities of the tray. To facilitate removal of the sealing film 118 to access an ink stick in a compartment, the sealing film may include one or more tabs (not shown) that extend beyond the outer flange of the tray to facilitate gripping by a user in order to peel off at least a portion of the film.

In one embodiment, the package 100 may be configured such that one or more cavities, or compartments, 108 of the tray may be removed, or separated, from the rest of the package. To this end, the package may include lines of weakness 120 that extend between the compartments 108 of the tray 104 that facilitate manual separation of the compartments. The lines of weakness 120 may be formed by continuous lines of reduced thickness, or by spaced perforations in the material.

Figure 7:
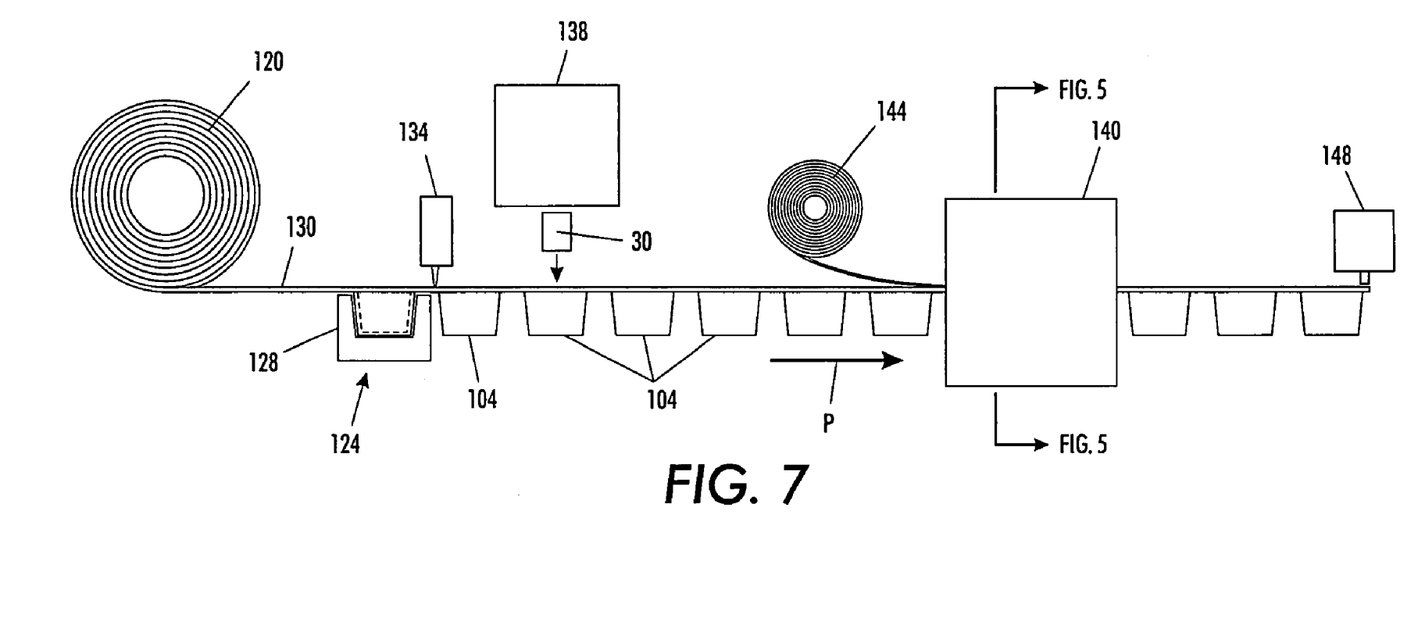
FIG. 7 is a schematic view of a system for forming, filling and sealing the multi-compartment tray of FIG. 5.

Referring now to FIG. 7, the general arrangement and sequence of operation of a system for making the package 100 is shown. The trays 104 of the packages to be formed are constructed from thermoplastic sheet of material paid out from a roll 120 in direction P. The sheet 130 is directed to a forming station 124 for performing a thermoforming operation in which the sheet is formed into a plurality of multi-compartment trays 104. In the embodiment of FIG. 7, the trays 104 are formed six compartments wide, but any suitable number of compartments may be formed. In one embodiment, the compartments, or cavities, 108 may be formed by the raising of a tool against the bottom of the film. The tool, or mold, 128 has a plurality of hollow cavities in which the film is to be formed to the desired shape for forming a plurality of packages. From the forming station 124, the sheet of material 130 may be advanced to a cutting apparatus 134 for cutting the sheet into individual trays 104. The formed trays may then be advanced to a dispensing station 138 for dispensing ink sticks 30 into the plurality of cavities of the trays. Once the cavities are filled, the formed and filled trays are advanced to a tray sealing station 140 at which a polymeric sealing film 144 may be placed on the flange of the tray and heat sealed thereto. The formed, filled, and sealed packages may then be indexed to a scoring station 148 for scoring the packages 104 between the respective compartments.

Figure 8:
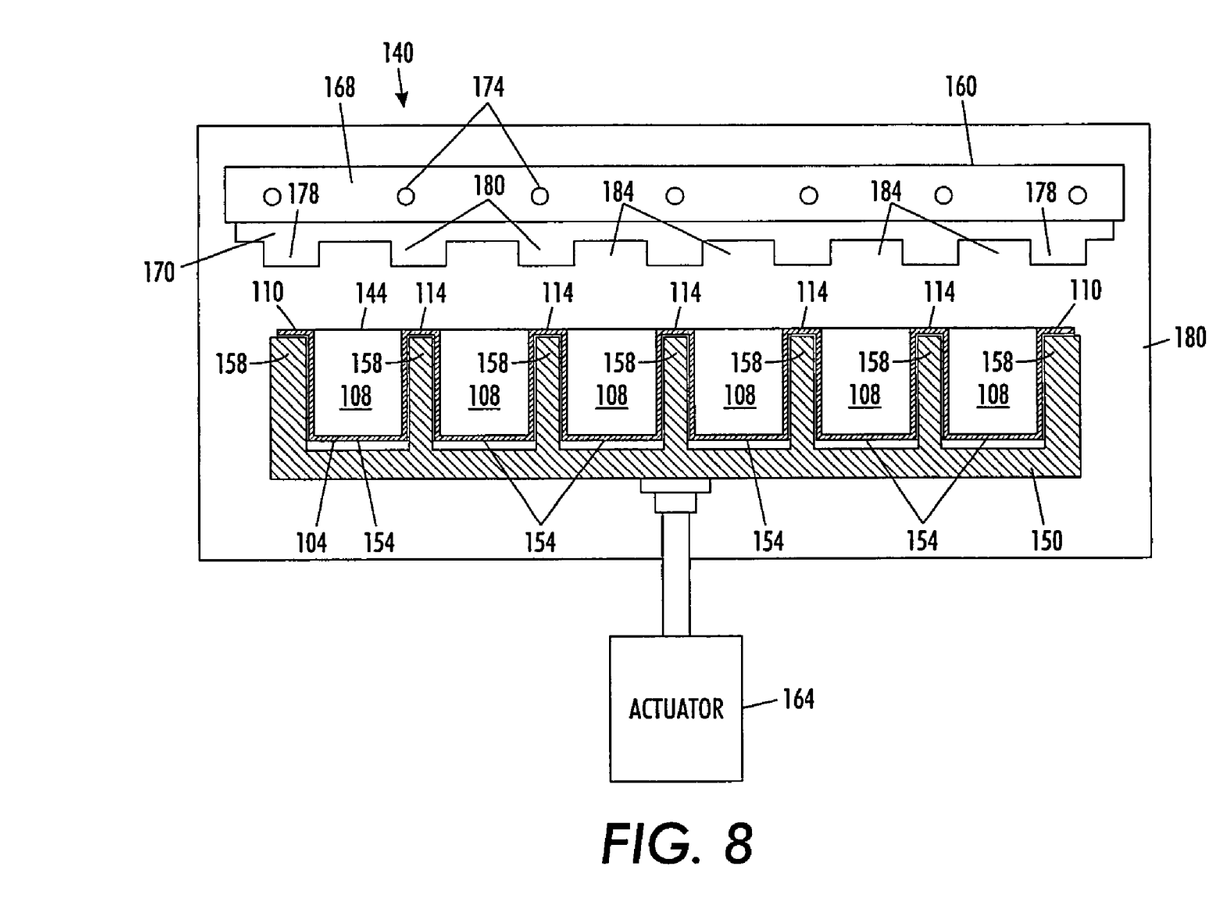
FIG. 8 is a schematic view of a sealing system for sealing the multi-compartment tray of FIG. 5.

Referring now to FIG. 8, the tray sealing system 140 may include at least one tray support 150 for supporting the flanges 110, 114 of a multi-compartment tray 104 during a sealing process. Tray support 150 defines a plurality of tray compartment recesses 154, shown here to be six. The number and arrangement of recesses in the receiver correspond to the number and arrangement of compartments 108 in a multi-compartment tray 104. Each recess 154 of the support 150 is surrounded by a peripheral ledge 158. When a tray is received in the tray support, the flange of the tray is configured to rest on peripheral ledge 158.

Figure 9:
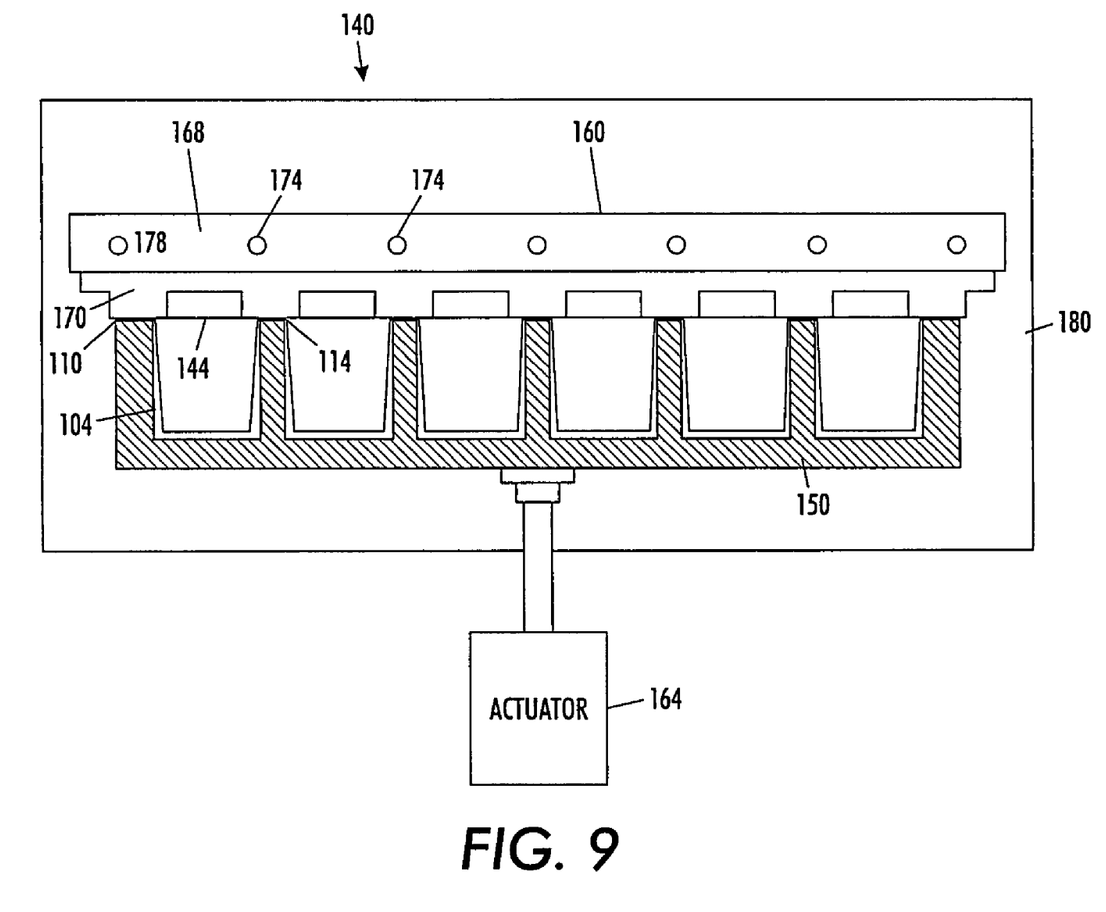
FIG. 9 is another schematic view of the sealing system for sealing the multi-compartment tray of FIG. 5.

In the sealing process, a sealing film 144 for sealing the tray 104 may be supplied from roll during the sealing process in a known manner. The tray sealing system 140 further includes a seal plate 160. In the embodiment of FIG. 8, the tray support frame 150 is movable between a retracted position shown in FIG. 8 and a seal position in engagement with seal plate 160 as shown in FIG. 9. To this end, the system may include an actuator 164 for controlling the movement of the tray support frame 150 in a known manner. In the seal position, the seal plate 160 is configured to apply heat and pressure to the sealing film 144 disposed over the tray 104 in order to heat seal the film 144 to the flange 110, 114 of the tray 104. The amount of heat and pressure which are necessary to effect the heat-seal are dependent upon a number of factors, e.g., the thickness and composition of the film 144, and may readily be determined by one having ordinary skill in the art.

Figure 10:
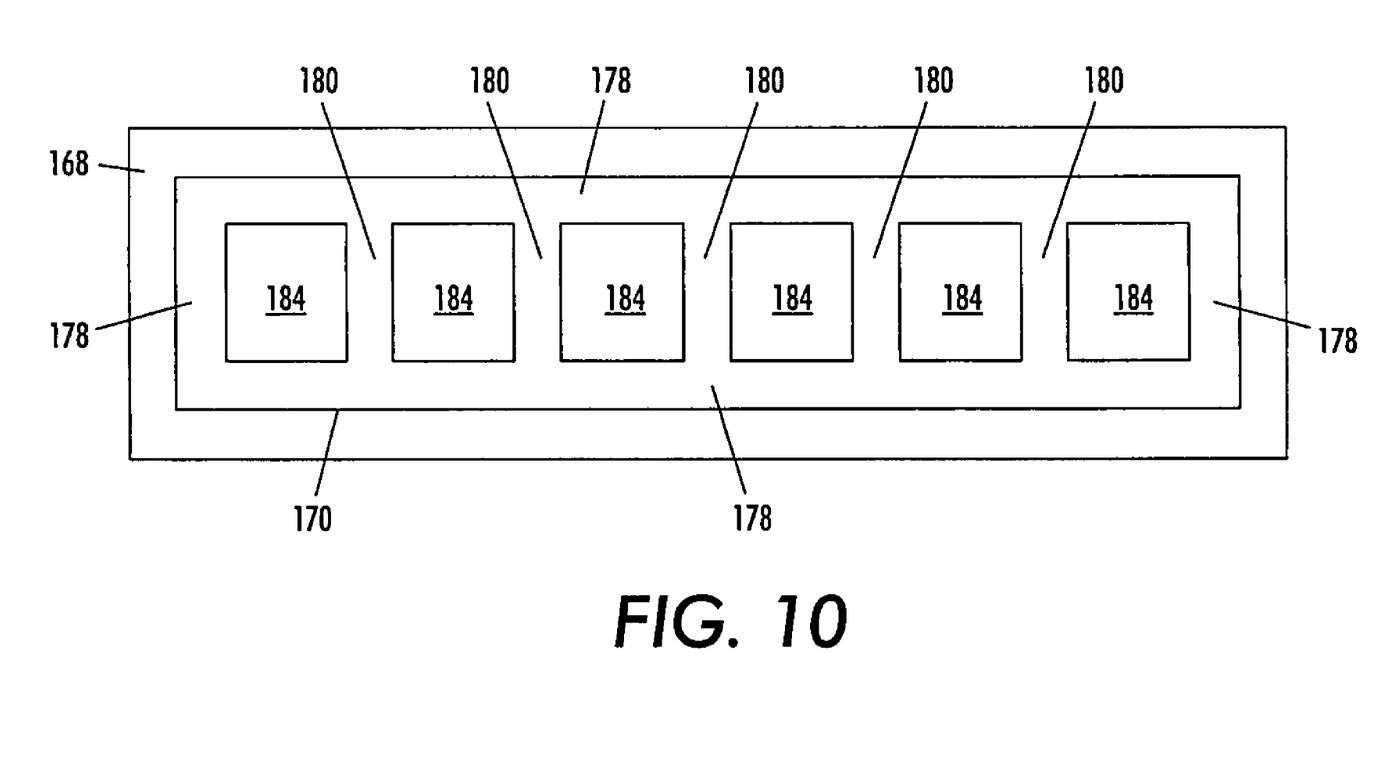
FIG. 10 is bottom view a sealing plate of the sealing system.

As shown in FIGS. 8-10, seal plate 160 may comprise a heating block having a contact surface 170. The heating block 168 and contact surface 170 may be formed integrally from a thermally conductive material having a high coefficient of heat such as, for example, aluminum. Machining of the seal plate 160 may be CAD controlled to meet flatness tolerances on all surfaces.

Heating block 168 may be heated using any suitable method. In the embodiment of FIGS. 8-10, the heating block 168 is heated by a series of heating elements 174 mounted within heating block 168 and connected to a source of electrical energy (not shown). Heating elements 174 are in thermal contact with heating block 168 so as to produce heating of contact surface 170. The heating elements 174 may comprise cartridge heaters mounted within a plurality of axial bores disposed in the heating block although any suitable method of heating the heating block 168 may be employed. In general, cartridge heaters convert electrical energy to heat energy. Therefore, the temperature thereof may be controlled by regulating the amount of electric current which is supplied to the cartridge heaters. In general, heating elements 174 may be maintained at any suitable temperature to achieve an effective heat seal of the sealing film to the tray.

Referring to FIG. 10, the contact surface 170 includes an outer or perimeter sealing surface 178 and one or more inner or intermediate sealing surfaces 180. The perimeter 178 and intermediate sealing surfaces 180 define recess perimeters in the contact surface that are positioned to correspond substantially to the compartment perimeters in the multi-compartment tray. The perimeter 178 and intermediate sealing surfaces 180 are substantially coplanar thereby providing a substantially flat surface for sealing the film to the tray. The perimeter sealing surface 178 extends around the perimeter of the contact surface 170 and is shaped and positioned to contact the sealing film along the perimeter flange 110 of the tray 104. The intermediate sealing surfaces 180 are shaped and positioned to engage the sealing film at the intermediate flanges 114, or tray portions between the compartments of the tray 104. The recesses 184 in the contact surface of the seal plate that are positioned over the tray compartments 108 act to lessen the amount of heat generated over these areas. Therefore, ink sticks placed in the tray compartments 108 are less likely to be affected by the heat generated by the seal plate 160.

The width of the perimeter 178 and intermediate sealing surfaces 180 of the contact surface 170 may be slightly greater than the widths of the perimeter and intermediate flanges 110, 114 of the tray, respectively. By providing widths of the perimeter and intermediate sealing surfaces 178, 180 greater than the corresponding flanges 110, 114 of the tray, the seal formed may be less sensitive to the amount of sealable area provided between the tray compartments for sealing. Moreover, with a wider sealing surface the system is less susceptible to problems associated with misalignment between the seal plate and the tray.

A sealing process utilizing the tray sealing system described above involves heating block 168 to a temperature suitable to heat the sealing film to a temperature at which the adhesive layer will soften and stick to container flange 36 in a peelable manner. One or more trays 104 may then be received in the tray support 150 of the tray sealing system 140. Once the tray(s) are in position in the tray support 150, a sealing film is positioned over the tray. The actuator 164 then raises the tray support 150 to the seal position (FIG. 9) in which the ledges 158 of the tray support 150 engage the contact surface 170 of the seal plate with the tray flange 110, 114 and sealing film 144 pressed therebetween. The tray support 150 is left in the seal position for a predetermined dwell time until the sealing film 144 has adequately sealed to the tray flange 110, 114. The actuator 164 then lowers the tray support thereby disengaging the seal plate 160 from the sealing film 144 and tray flange 110, 114. The sealed tray may then be advanced to the scoring station 148 for scoring the tray flange between the compartments to facilitate separation of the tray compartments.

The tray sealing system may be configured to seal a single multi-compartment tray at a time as shown. In other embodiments, the tray sealing system may be configured to seal two or more trays at a time. For instance, the tray support may be configured to accommodate two or more trays simultaneously. A seal plate may have two contact surfaces adapted for sealing the trays simultaneously. The system of FIG. 7 may further include a transport system, such as a conveyor, for moving trays from station to station. In another embodiment, the tray sealing station 140 including tray support 150 and seal plate 160 may be mounted in an enclosed chamber 180 in order to seal the tray in a controlled atmosphere such as a vacuum. In another embodiment, the tray sealing system 140 may be configured to seal the trays while the containers are continuously moving along a path. In this embodiment, the tray sealing system may include a reciprocating carriage which reciprocates over the continuously moving path of trays, with the carriage matching the speed and direction of the moving trays for a period of time.

Those skilled in the art will recognize that numerous modifications can be made to the specific implementations described above. For example, those skilled in the art will recognize that the tray sealing station may be incorporated into existing form/fill/seal machines are may be utilized as a stand alone system. Also, while the embodiments above have been described with reference to sealing containers for solid ink sticks, the sealing system may be utilized to seal a wide variety of containers configured for a multitude of different products. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A tray sealing system for heat sealing a film onto a multi-compartment container, the system comprising:

a tray support having a plurality of recesses, each recess being configured to receive a compartment of a multi-compartment tray, each recess of the tray support is surrounded by a peripheral ledge upon which a perimeter flange and a plurality of intermediate flanges of the multi-compartment tray rest;

a sealing plate having a contact surface for contacting and heat sealing a sealing film placed over the multi-compartment tray received in the tray support, the contact surface having a perimeter sealing surface and a plurality of intermediate sealing surfaces that are configured to form recess perimeters that correspond to perimeters of the compartments in the multi-compartment tray, the perimeter sealing surface and the intermediate sealing surfaces having widths that are wider than the perimeter flange and intermediate flanges of the multi-compartment tray and the sealing plate being positioned over the tray support to enable the perimeter sealing surface and the intermediate sealing surfaces to be above the perimeter flange and intermediate flanges of the multi-compartment tray and to extend beyond the perimeter flange and intermediate flanges of the multi-compartment tray to an area above the recesses of the multi-compartment tray; and an actuator for pressing the tray support and sealing plate together to press and heat the sealing film against the perimeter flange and the intermediate flanges of the multi-compartment tray.

2. The system of claim 1, the actuator being configured to raise the tray support with the multi-compartment tray and the sealing film thereon into engagement with the contact surface of the sealing plate.

3. The system of claim 1, the sealing plate including a heating element disposed within the sealing plate that generates sufficient heat in the contact surface of the sealing plate to heat seal the sealing film to the perimeter and intermediate flanges of the multi-compartment tray when the contact surface engages the perimeter and intermediate flanges of the multi-compartment tray.

4. The system of claim 3, the sealing plate being formed substantially of aluminum.

5. The system of claim 3, the heating element comprising at least one cartridge heater mounted within at least one axial bore in the sealing plate.

6. The system of claim 1, the contact surface being configured to seal the sealing film to the intermediate flanges of the multi-compartment tray between six linearly arranged compartments.

* * * * *